Dec. 20, 1955

A. M. BANK ET AL 2,727,561

CHAIR HAVING RECLINING SEAT AND BACK REST AND UPWARDLY
AND FORWARDLY SWINGABLE LEG REST

Filed Dec. 20, 1952

Inventor
ALBERT M. BANK
ALEX J. KATZ

By

J. B. Felshin

Attorney

Dec. 20, 1955

A. M. BANK ET AL 2,727,561

CHAIR HAVING RECLINING SEAT AND BACK REST AND UPWARDLY
AND FORWARDLY SWINGABLE LEG REST

Filed Dec. 20, 1952

Inventor
ALBERT M. BANK
ALEX J. KATZ

By J. B. Felshin
Attorney

Dec. 20, 1955

A. M. BANK ET AL 2,727,561

CHAIR HAVING RECLINING SEAT AND BACK REST AND UPWARDLY
AND FORWARDLY SWINGABLE LEG REST

Filed Dec. 20, 1952

INVENTOR.
ALBERT M. BANK
BY ALEX J. KATZ

ATTORNEY

Dec. 20, 1955 A. M. BANK ET AL 2,727,561
CHAIR HAVING RECLINING SEAT AND BACK REST AND UPWARDLY
AND FORWARDLY SWINGABLE LEG REST
Filed Dec. 20, 1952 6 Sheets-Sheet 6

INVENTOR.
ALBERT M. BANK
BY ALEX J. KATZ

ATTORNEY

United States Patent Office 2,727,561
Patented Dec. 20, 1955

2,727,561

CHAIR HAVING RECLINING SEAT AND BACK REST AND UPWARDLY AND FORWARDLY SWINGABLE LEG REST

Albert M. Bank, Jersey City, and Alex J. Katz, Belleville, N. J., assignors, by mesne assignments, to Super Sagless Spring Company, Jersey City, N. J., a partnership Application December 20, 1952, Serial No. 327,116

24 Claims. (Cl. 155—106)

This invention relates to reclining chairs of the type where the backrest, seat and legrest operate in synchronism when the occupant moves from upright to a reclining posture or back to upright position.

The problem with other chairs of this type now on the market is that they cannot give the length necessary to accommodate tall persons and yet maintain correct styling. The reason is that in such prior constructions, the backrest is hinged to the seat or the backrest is fixed at right angles to the seat. With such construction the seat either moves forward when the backrest moves back, or the seat tilts upwardly when the backrest moves back. In cases where the backrest is pivoted at its lower end to the seat, the backrest would have to be made extremely high to get any length in reclining position, thus destroying good styling. Furthermore, where the pivot for the backrest is at the level of the seat, any extensions on the backrest, such as wings, cannot bypass the arms or the supporting frame unless the arms are cut back, and again such procedure limits the styling of the chair.

It is therefore an object of this invention to provide an article of furniture described, so constructed that it will open up for a length suitable for tall persons without destroying the true lines which are well established in chair line technique. Such chairs comprise a supporting frame and a backrest pivoted substantially below the seat to the supporting frame. The construction also includes a seat controlled by the movement of the backrest and movable thereby as a whole to tilting position, and, at the same time, rearwardly toward the backrest as the backrest is swung back. With such construction since the backrest is pivoted below the seat, it will move back to a greater degree, and yet the gap between the backrest and the seat is taken up because the seat moves rearwardly or backwards toward the backwardly tilted backrest.

A further advantage of pivoting the backrest below the seat is that such construction gives a large radius of movement to the wings on the backrest so that the wings on the backrest may easily pass over the arms on the supporting frame without interference. With the present construction it is possible to obtain considerable increase in over-all length in reclining position without destroying the styling of the chair. Thus two chairs styled exactly the same in height of the back from the floor and depth of seat and seat height from the floor, one made in accordance with the invention and one constructed in accordance with the prior art, the first will have a greater length in reclining position because of the improved construction disclosed herein. This is true because in the present construction, the backrest, seat and legrest are not directly connected together. The legrest in accordance with the present invention swings upwardly and forwardly toward horizontal position as the backrest is swung back. The legrest is not hinged directly either to the frame or to the seat as in prior constructions. The present chair when moved to reclining position follows the human anatomy as well as human dimensions, substantially, to give considerable comfort in use.

Another advantage of the present construction is that because of the gap between the legrest and the seat, a person reclining in the chair may rest his feet on the rear edge of the legrest, which makes for one comfortable position of use.

Another object of this invention is to provide in a chair of the character described, a backrest which is pivoted to the supporting frame below the seat and also has a portion extending below the pivot, so that as the backrest is swung rearwardly to reclining position, a greater portion of the backrest is exposed.

A further object of this invention is to provide a construction of the character described in which the backrest serves as a lever pivoted at a point below the seat but provided with a downward extension to which a system of links and levers are connected for moving both the seat and the legrest.

Still another object of this invention is to provide a device of the character described, in which the rear end of the seat is provided with a resilient support to increase the comfort of the user.

Yet another object of this invention is to provide a device of the character described, in which the legrest is connected to the supporting frame of the chair by a lazy tong connection which projects the footrest from a vertical position extending downwardly from the front end of the seat, to a substantially horizontal position extending forwardly of and substantially at the level of the front end of the seat, after said seat has been swung upwardly to inclined position, the construction being such that the legrest is moved forwardly of the supporting frame to increase to the desired all over length of the device in reclining position.

Still a further object of this invention is to provide a chair or sofa of the character described, provided with highly improved braking means which is constant and requires no manual adjustments for retaining the chair or sofa in intermediate position.

Yet another object of this invention is to provide a device of the character described which shall be relatively inexpensive to manufacture, smooth and positive in operation, comfortable, restful and healthful to use, and which shall be comfortable and highly efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention:

Fig. 3 is a view similar to Fig. 2 and showing the position of the chair when moved to a partial reclining position;

Fig. 5 is a cross sectional view taken on line 5—5 of Fig. 4;

Referring now in detail to the drawing, and particularly to Figs. 1 to 12, numeral 10 designates a chair or sofa or like article of furniture embodying the invention. The same comprises a support or frame 20 provided with front legs 21 and rear legs 22. The front and rear legs are interconnected by side walls 23 and 24. At the upper ends of said side walls are arm rests 25 and 26. The two sides of the frame 20 are interconnected in any suitable manner, as by transverse brace frame portions 20a and 20b.

Between the sides of the frame are mounted in a manner hereinafter described, in detail, a seat 27, a backrest 28, disposed rearwardly and upwardly of the seat, and a legrest 29 disposed at the forward end of the seat. Said seat, backrest and legrest combine to form the body supporting elements of the chair or sofa embodying the present invention and the manner of mounting the same will be described hereinafter.

Secured to the inner sides of the frame 20 below the arm rests are a pair of horizontally disposed side bars 30 fixed thereto in any suitable manner. The forward ends 31 of said side bars may be secured to the legs 21 by screws or fasteners 32. Their rear ends 33 are secured to the rear legs 22 by screws or fasteners 34. Attached to each of the fixed bars 30 and spaced inwardly therefrom is a somewhat Z-shaped fixed supporting member 40a. Members 40a are secured to members 30 by fasteners 41 and 42 carrying spacers 43 and 44 to space members 40a from said members 30. Each Z-shaped member 40a has a front upwardly and forwardly inclined portion 45, a rear downwardly and rearwardly inclined portion 46, and an intermediate portion 47 which is inclined forwardly and downwardly.

It will be understood that each pair of members 30 and 40a could be replaced by a single supporting member, if desired.

It will be understood that the supporting frame 20 together with the arm rests may be upholstered in any suitable manner, to enclose the links and levers which support the backrest, seat and legrest, and which will be described hereinafter.

The backrest 28 comprises a backrest frame 28a and may be upholstered by suitable upholstering 28b. Attached to the frame 28a are extension bars 36 having downwardly projecting lower end portions 37.

Fixed to the insides of the rear legs 22 as by fastening elements 39 are brackets 38 supporting pivot pins 40 which pass through suitable openings in the extension bars 36 above their lower ends, for pivotally connecting the backrest to the legs. It will now be understood that when the backrest is swung downwardly and rearwardly, the lower ends 37 of the bars 36 will swing forwardly and upwardly.

Means is provided to control the movement of the seat 27 upon moving the backrest. To this end there is attached to the underside of the seat 27 a pair of parallel bars 48 which run from front to rear. Pivoted to the inner sides of bars 40a on pivot pins 155 are bell crank levers 50. On pivot pins 155 are spacer sleeves 155a. Each bell crank lever 50 comprises a forwardly and upwardly extending arm 50a extending from adjacent pivot 155. Extending downwardly and forwardly from adjacent said pivot is an arm 53 from the lower end of which there extends forwardly and upwardly a foot portion 54. It will be noted that the arms 50a and 53 of the bell crank levers 50 straddle the cross member 20b so that said levers may rotate without interference from said cross member.

Figures 4, 9, 10, 11:
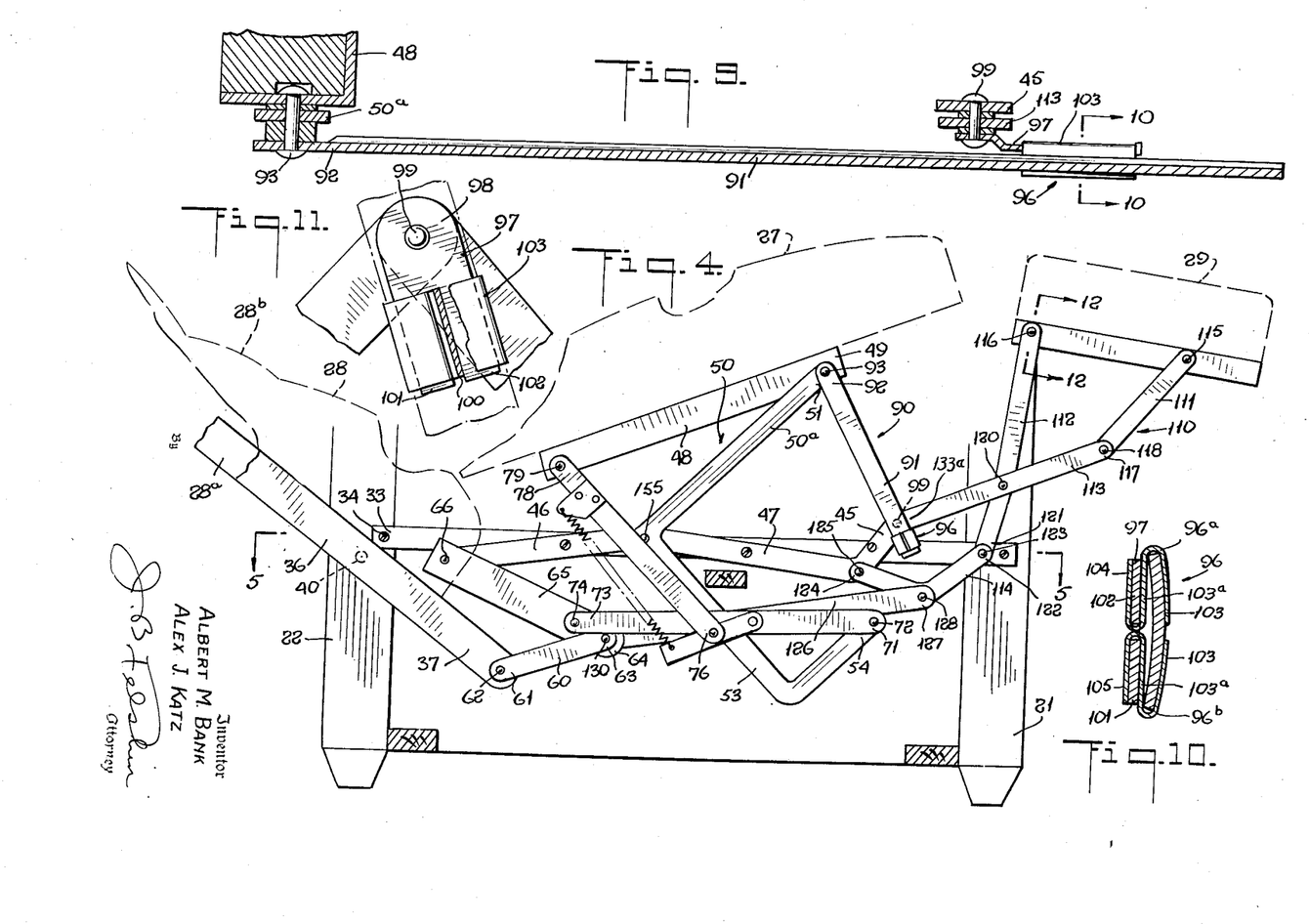
Fig. 4 is a view similar to Fig. 3 and showing the chair in full reclining position.
Fig. 9 is a cross sectional view taken on line 9—9 of Fig. 3.
Fig. 10 is a cross sectional view taken on line 10—10 of Fig. 9.
Fig. 11 is a partial side elevational view illustrating the friction brake.
Figures 6, 7, 8, 9, 10:
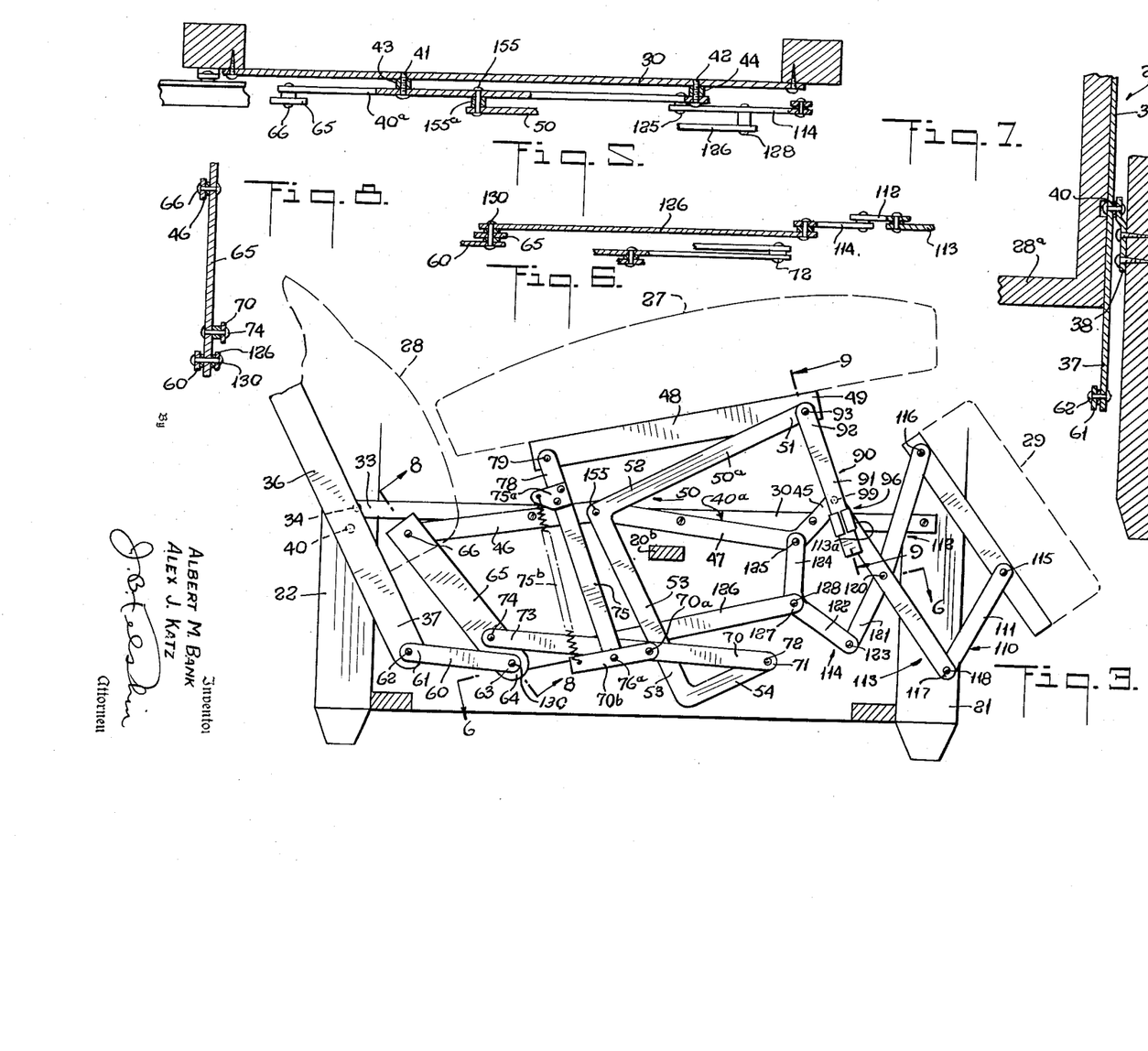
Fig. 6 is a cross sectional view taken on line 6—6 of Fig. 3.
Fig. 7 is a cross sectional view taken on line 7—7 of Fig. 2.
Fig. 8 is a cross sectional view taken on line 8—8 of Fig. 3.

Attached to each of the parallel bars 48 is a fixed pivot 93 (see Fig. 9). The upper end of each arm 50a of lever 50 is pivoted to one of said pivot pins 93. The pivot pins 155 are located substantially at the junction of portions 46 and 47 of members 40a. Carried by rear ends of portions 46 of members 40a are rivets 66. Pivoted to each rivet 66 is the upper end of an arm 65. The lower end 64 of each arm 65 is connected as by pivot pin 130 to one end 63 of a link 60. The other end 61 of said link is connected by pivot pin 62 to the lower end 37 of one of the side bars 36. The forward ends of portions 54 of the bell crank levers 50 carry pivot pins 72. Pivoted to each pivot pin 72 is the front end 71 of a link 70. The rear end 73 of each link 70 is connected as by pivot pin 74 to one of the links 65 at a point spaced above the pivot pin 130.

It will now be understood that when the backrest is swung rearwardly, the extensions 37 will swing forwardly and the links 60 will cause links 65 to swing forwardly and upwardly. At the same time the links 70 are pressed forwardly to cause the bell cranks 50 to swing in counterclockwise directions for raising the front ends of the seat 27.

Pivoted as by pivot pins 79 to the rear ends of the bars 48 are the upper ends 78 of links 75. Pivoted to intermediate portions of the links 70 as by pivot pins 70a are the forward ends of links 70b. The lower ends 76 of the links 75 are pivoted as by pivot pins 76a to intermediate portions of the links 70b. Attached to each link 75 below its upper end is a bracket 75a. Interconnecting each bracket 75a with the rear end of each link 70b is a coil tension spring 75b. It will now be understood that if a person sits on a seat 27, pressure will be extended downwardly on the links 75 causing the links 70b to swing downwardly about the pivot pins 70a thereby tensioning the springs 75b. Such action provides resiliency for the seat.

It will be further noted that when the backrest is swung rearwardly towards reclining position, forward movement of the links 70 together with the upwardly swinging movement of the bell cranks 50 will cause the seat 27 to move rearwardly toward the backrest. It will be noted furthermore that the pivot pins 40 are located well below the seat 27.

The backrest 28 is formed with wings 28c which overlie the upper ends of the arm rests 25, 26. By reason of the fact that the pivot for the backrest is well below the seat, the wings 28c swing on a long arc so as to by-pass the arm rests 25, 26. If the backrest were pivoted about an axis at the level of the seat, the lower ends of the wings would swing on a smaller radius and would wedge against the rear ends of the arm rests, so that either the rear ends of the arm rests would have to be cut away or greater spaces would have to be provided between the arm rests and the undersides of the wings. With the present construction better styling can be obtained because only a small space is required between the wings and arm rests. Nevertheless movement of the wings will not be interfered with by the arm rests.

It will now further be understood that when the backrest is swung rearwardly, by reason of the fact that the pivot for the backrest is below the seat, the area at the front of the backrest exposed above the seat increases, so as to add supporting area for the body of the person reclining in the chair and adding to his comfort. Since the seat moves back following the backrest, there is no space between the seat and the backrest which would prevent comfort. It will be noted that the seat is not pivoted directly to the backrest but moves wholly or bodily both rearwardly and in inclination. Thus the seat floats relatively to the backrest and does not have any fixed point of connection to the backrest. The springs 75b furthermore, aid the person sitting in the chair to move from reclining position to sitting position. The person sitting in the chair will exert pressure on the backrest to move towards reclining position and will exert pressure on the front of the seat to permit the backrest to move up toward upstanding position.

Means is provided to move the legrest 29 relative to the frame, backrest and seat upon moving the backrest. To this end there is pivoted to each pivot pin 130 the rear end of a link 126. The front end 127 of said link carries a pivot pin 128. Pivoted to the pivot pin 128 of each link 126 is a bell crank shaped link or lever 114 having one arm 124 pivoted as by pivot pin 125 to member 40a at the junction of portions 45 and 47 of said member. The other arm 122 of bell crank shaped link 114 is connected by means of pivot pin 123 to arm 121 of a lever 112. The upper end of each lever 112 is connected as by pivot pin 116 to the upper end of footrest 29. Pivoted to pivot pin 99 carried by upper end of each portion 45 of member 40a is the upper end 113a of a lever 113. An intermediate portion of lever 113 is connected by pivot pin 120 to an intermediate portion of lever 112. Thus levers 112 and 113 cross in lazy tong fashion. The lower end 117 of lever 113 is connected by pivot pin 118 to the lower end of a link 111. The upper end of link 111 is connected by pivot pin 115 to the lower portion of footrest 29. It will be noted that the links and levers on both sides of the frame are similar and only one side has been described.

Figures 1, 2, 12:
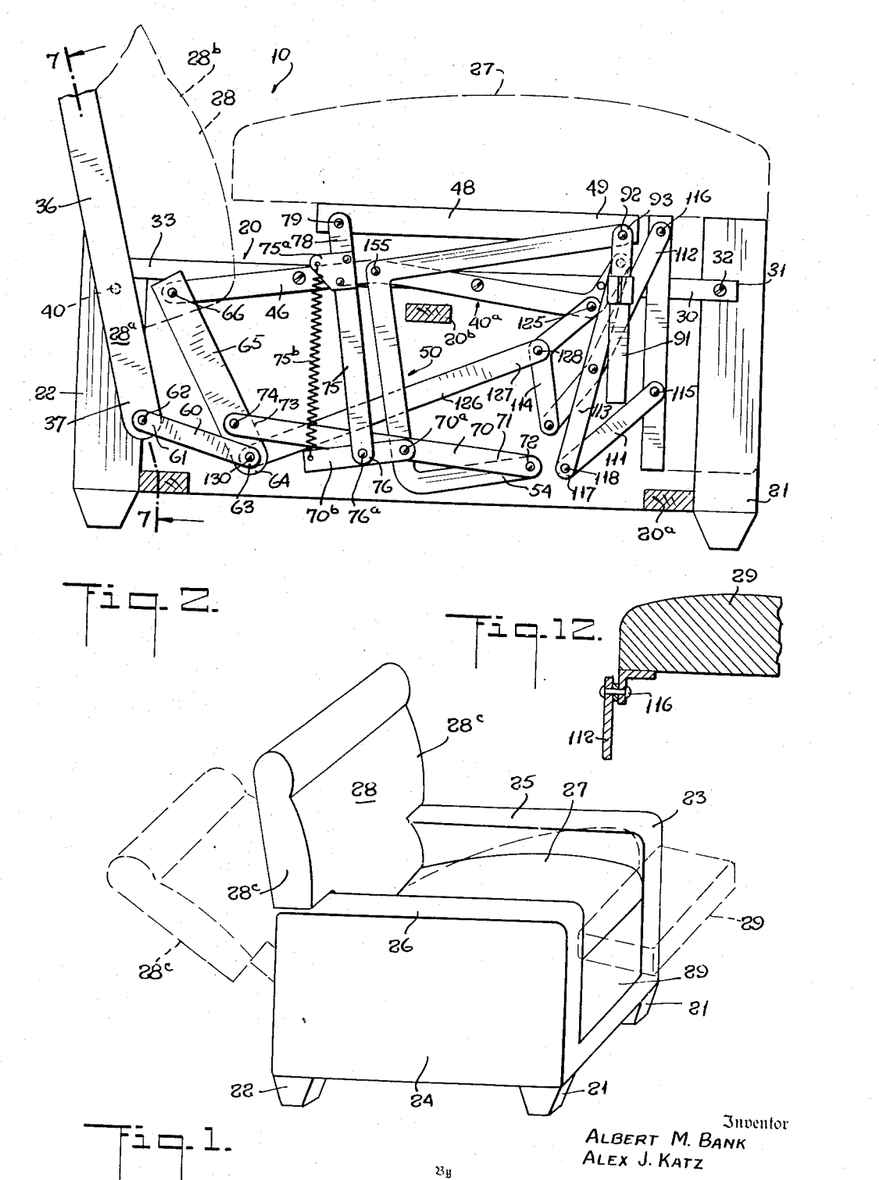
Fig. 1 is a perspective view of a chair embodying the invention showing the sitting position of the chair in full lines and the reclining position of the chair in dot-dash lines.
Fig. 2 is a side elevational view of the chair illustrating a system of links and levers interconnecting the backrest, frame, seat and legrest.
Fig. 12 is a cross sectional view taken on the line 12—12 of Fig. 4.

It will be noted furthermore that the levers 112, 113 and links 111 and 114 constitute a lazy tong mechanism 110 for projecting the legrest from the position of Fig. 2 to the position of Fig. 3 as the backrest is swung rearwardly towards reclining position. The legrest furthermore moves from the position of Fig. 3 to the position of Fig. 4 as the backrest is swung further down to fully reclining position. Thus the legrest moves or is swung forwardly and upwardly from a vertical position below and extending downwardly from the underside of the front end of the seat to a somewhat downwardly and forwardly inclined position substantially at the level of the front end of the seat when the latter is inclined forwardly and upwardly in the position of Fig. 4.

It will now be understood furthermore that as the backrest is swung rearwardly, the legrest moves bodily relative to the supporting frame, backrest and the seat. The legrest is not pivoted directly to the front end of the seat. The legrest moves forwardly while the seat moves rearwardly and increases the space between the legrest and the front end of the seat thus increasing the over-all length of the chair or sofa to accommodate taller persons. The knees of the person in the chair straddle the space which does not make for any discomfort. The legrest moves upwardly almost to the level of the front end of the seat so that the legs may rest thereon with great comfort.

The movement of the legrest is caused by the forward projecting movement of the link 126 which is connected through link 60 to the backrest. Forward and upward movement of the links 126 will cause swinging of the bell cranks, links or levers 114 in a clockwise direction looking at the drawing. Such movement will cause upward movement of levers 112 and consequent upward swinging movement of levers 113. The movement of the crossing levers 112, 113 produce a lazy tong action, and the connecting links 111, 114 will cause the lower end of the legrest to swing forwardly and upwardly while the pivot pins 116 move upwardly and forwardly.

Means is provided to brake the movement of the chair parts to hold the elements of the chair in any position to which they are moved. To this end there is pivoted to each of the pivot pins 99 (see Figs. 9, 10, 11) a bar 97 formed with a longitudinal slit 100 forming a pair of bifurcated arms 101, 102 the outer ends of which are offset.

Mounted on said arms 101, 102 on each side of the chair is a friction brake 96 made of resilient sheet members 96a and 96b. Said members 96a and 96b each comprise a transverse curved portion 103 from which extend inwardly portions 103a contacting surfaces of arms 101, 102. Extending from the inner ends of portions 103a are upwardly bent portions passing through slots 100 and from which extend wings 104, 105 engaging the offset surfaces of the arms 101, 102. Members 96a and 96b are held on the bar 97 by the offset portions or feet at the lower ends of the arms 101, 102.

Pivoted to each pivot pin 93 is the upper end 92 of a bar 90. The lower end 91 of each bar 90 passes through the members 96a and 96b. Said lower end portion of the bar 91 is transversely curved and passes between portions 103 and 103a of members 96a and 96b. It will be noted that when the chair is moved from the position of Fig. 2 to position of Figs. 3 and 4 member 90 will have relatively large sliding movement through members 96a and 96b. Such movement is braked by frictional and resilient action between bar portion 91 and the portion of members 96a and 96b it contacts. Thus members 96a and 96b acting on members 91 serve as a friction brake which tend to hold the movable chair elements in any position to which it is moved while permitting the chair to be readily moved from one position to another.

Figure 13:
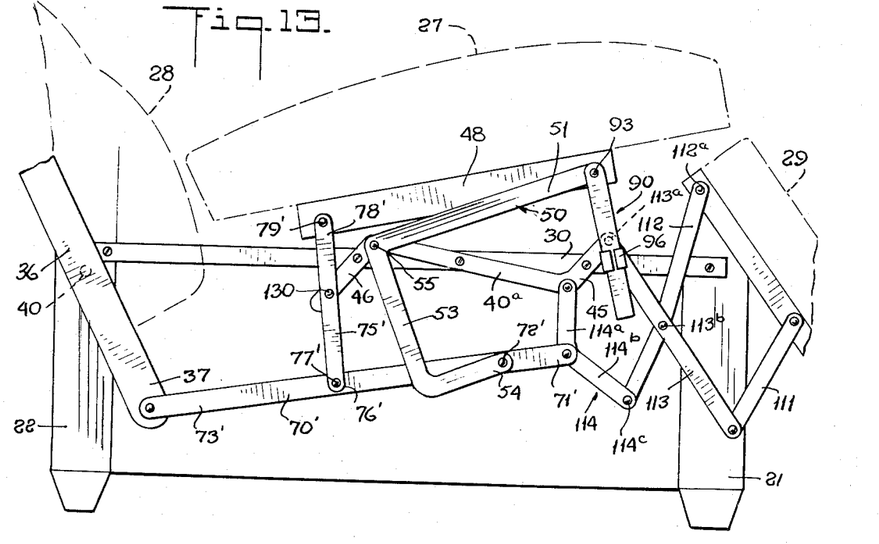
Fig. 13 is a view similar to Fig. 3 but illustrating a modified construction.

In Fig. 13 there is shown a modified construction. Only one side of the mechanism which interconnects the backrest 28 with the seat 27 and legrest 29 is illustrated, it being understood that the mechanism is the same on opposite sides of the chair. The mechanism on only one side will therefore be described.

Fixed to the backrest 28 is a lever 36 pivoted to the supporting frame as on pivot 40 disposed below the seat 27. Extending down below the pivot 40 is the extension 37. Pivoted to the supporting frame member 40a as at pivot 55 is a bell crank 50 having an upwardly and forwardly inclined arm 51 pivoted as at 93 to the front end of the bar 48 fixed to the underside of seat 27. Lever 50 has a downwardly extending arm 53 from which extends forwardly, arm 54. The lower end of extension 37 is connected to the outer end of arm 54 by link 70'. The rear end 73' of link 70' is thus pivoted to the lower end of extension 37. Said link 70' is pivoted by pivot 72' to the forward end of arm 54. Said link 70' has a forward extension 71' for the purpose hereinafter appearing. A lever 75' is pivoted to the rear end of support 40a as on pivot pin 130, and has its lower end 76' pivoted as by pivot pin 77' to an intermediate portion of the link 70'. The upper end 78' of the link 75' is pivoted as by pivot 79' to the rear end of the seat supporting bar 48.

It will now be understood that when the backrest is swung rearwardly, link 70' will rotate the bell crank 50 to cause the seat to tilt upwardly, and at the same time lever 75' will rotate in a counterclockwise direction, looking at Fig. 13, to move the seat as a whole rearwardly to keep the space between the seat and the backrest substantially closed.

Pivoted to the forward end 71' of the link 70' is a link or lever 114. The said link 114 has an upwardly extending arm 114a pivoted to the supporting frame member 40a. Pivoted to the lower end of the downwardly extending arm 114b of link 114 as by pivot 114c is the lower end of a lever 112 which forms part of a lazy tong. The upper end of said lever is pivoted as at 112a to the upper end of the footrest 29. Also pivoted to the supporting frame member 40a as on pivot 113a, is the upper end of a lever 113 which crosses the lever 112 and is pivoted thereto as by pivot pin 113b to form the lazy tong. The lower end of the lever 113 is connected by link 111 to the lower end of the footrest 29.

It will be noted that the connection of the legrest 29 in Fig. 13 to the supporting frame by lazy tong mechanism 110 is the same as shown in Fig. 3.

It will now be understood that as the backrest is swung rearwardly, link 70' will swing lever 114 upwardly in a counterclockwise direction to cause the legrest to move from a vertical position to a horizontal position in the same manner as disclosed in Fig. 4. The chair shown in Fig. 13 may be provided with a bar 90 slidable in a brake member 96 the same as in the modification described above to retard movement of the movable chair parts.

Figure 14:
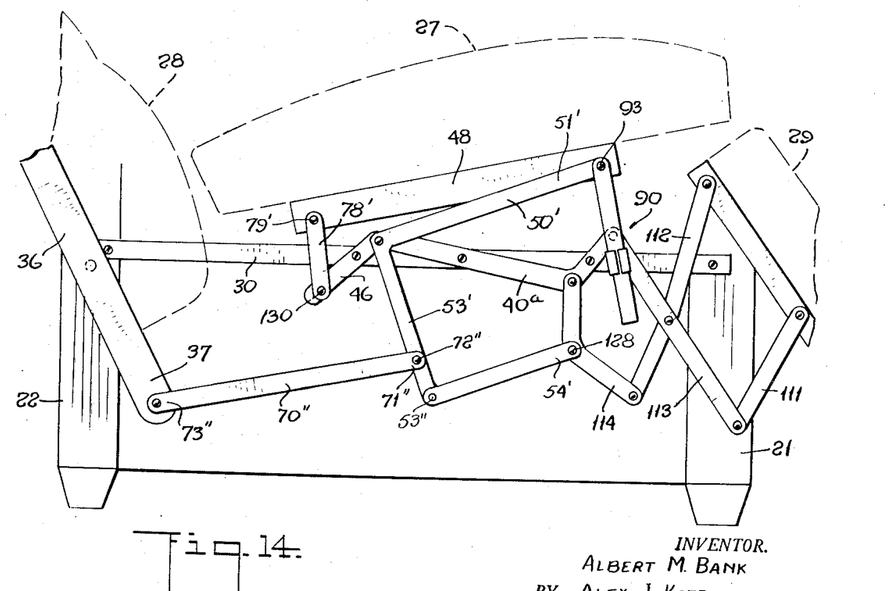
Fig. 14 is a view similar to Fig. 13 and illustrating still a further modified construction.

In Fig. 14 the lever 75' is replaced by a link 78' interconnecting the pivot pin 130 on the rear end of the supporting frame member 40a with the pivot pin 79' at the rear end of the seat bar 48. The lever 50 is replaced by lever 50' having an upwardly and forwardly extending arm 51' pivoted as at 93 to the front end of the seat supporting bar 48. Said lever 50' has a downwardly extending arm 53'. A link 70" has a rear end 73" pivotally connecting to the lower end of extension 37 of lever 36. The forward end 71" of lever 70" is connected by pivot pin 72" to the arm 53'. The arm 53' extends down below the pivot pin 72". Its lower end is pivoted as by pivot pin 53" to a link 54'. Said link 54' is pivoted at its forward end by means of pivot pin 128 to an intermediate portion of lever 114. The legrest 29 is connected to the supporting frame lazy tong mechanism 110 the same as in the two modifications described above.

Figures 15, 16, 17:
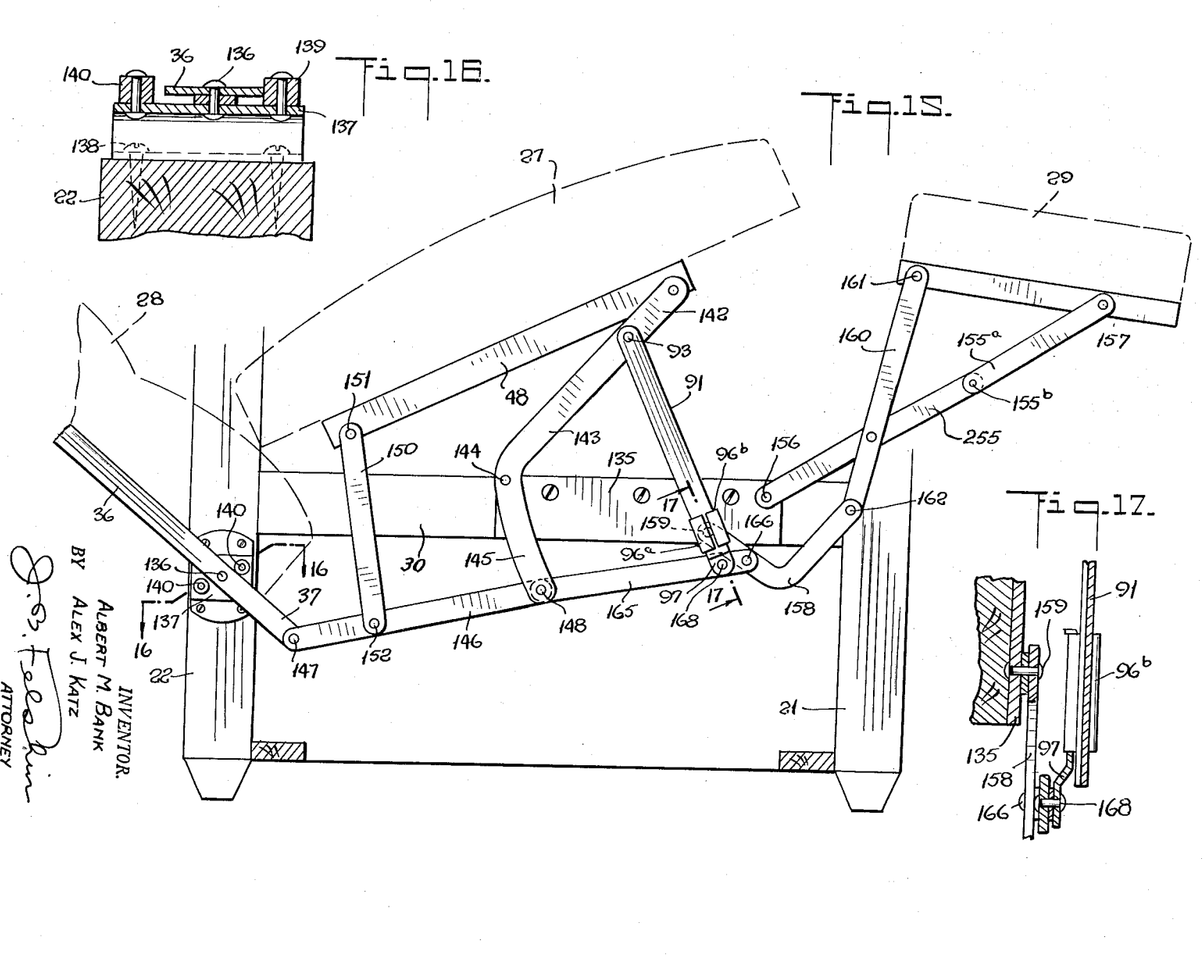
Fig. 15 is a side elevational view illustrating another form of the invention.
Fig. 16 is a sectional view taken on the line 16—16 of Fig. 15.
Fig. 17 is a cross sectional view taken on line 17—17 of Fig. 15.

Another and simplified form of the invention is illustrated in Fig. 15, wherein a pair of spaced plates 135 adjacent opposite sides of the chair frame are fixed thereto by the bars 30. The back rest extension bars 36 are pivoted adjacent to and spaced inwardly from their lower ends 37 at pivot pins 136. The pivot pins 136 are mounted in brackets 137 which are each secured to one of the rear legs 22 by screws or fasteners 138. On the brackets 137, on opposite sides of pins 136, are stop members 139 and 140. The stop members are preferably fabricated of wear resistant material and serve to limit the rotative movement of the backrest 28 by abutting engagement with the extension bars 36.

As hereinbefore described, it is desired to effect rearward inclination of the seat 27 upon rearward swinging of the backrest 28. To this end there is pivoted at the forward portion of each of the bars 48 one arm 142 of a bell crank 143. Each bell crank has its intermediate portion connected to the adjacent plate 135 by a pivot pin 144. Connecting the lower ends 37 of extensions 36 and the other arms 145 of bell cranks 143 are links 146, which are each secured to the adjacent extension 36 and arm 145 by pivot pins 147 and 148, respectively. Thus, through links 146, rearward swinging movement of the backrest 28 will effect counterclockwise rotation of bell cranks 143. To support the rearward portion of seat 27 links 150 are pivotally connected by pins 151 to the rearward portions of bars 48 and are pivotally connected by pins 152 intermediate the ends of links 146. Thus, it is seen that the seat 27 will be moved to a rearwardly inclined position upon swinging movement of the backrest 28.

It is also desired to control the movement of legrest 29 by rearward swinging movement of backrest 28. In furtherance of this end, levers 255 have their rear ends pivoted to plates 135 by pins 156, and their forward ends pivoted to links 155a by pins 155b. Said links 155a are pivoted to the footrest 29 by pins 157. A pair of links or crank arms 158 each have one end pivoted to the adjacent plate 135 by a pin 159, and each have its other end connected to legrest 29 by links 160. The links 160 are arranged in crossing interpivoted relation with respect to the links 255 and have one end connected to the legrest 29 by pivot pins 161 and have the other ends connected to crank arm 158 by pivot pins 162. Thus, the movement of legrest 29 is controlled by the lazy tong mechanism which comprises crossing interpivoted levers 255 and 160, and links 155a and 158. In order to actuate such mechanism, a link 165 has one end pivoted to pin 148 and has the other end connected to link or crank arm 158 by pin 166. As the backrest 28 is swung rearwardly, to effect the counterclockwise rotation of the bell crank 143, the link 165 is moved forwardly and upwardly to cause counterclockwise rotation of crank arm 158 and effects the desired movement of footrest 29.

Brake means, similar to that hereinbefore described, is provided in the present form of the invention. A bifurcated bar 97 is pivoted to pin 168 and provided with members 96a and 96b, which members frictionally engage the bar 91 pivoted at point 93.

Figure 18:
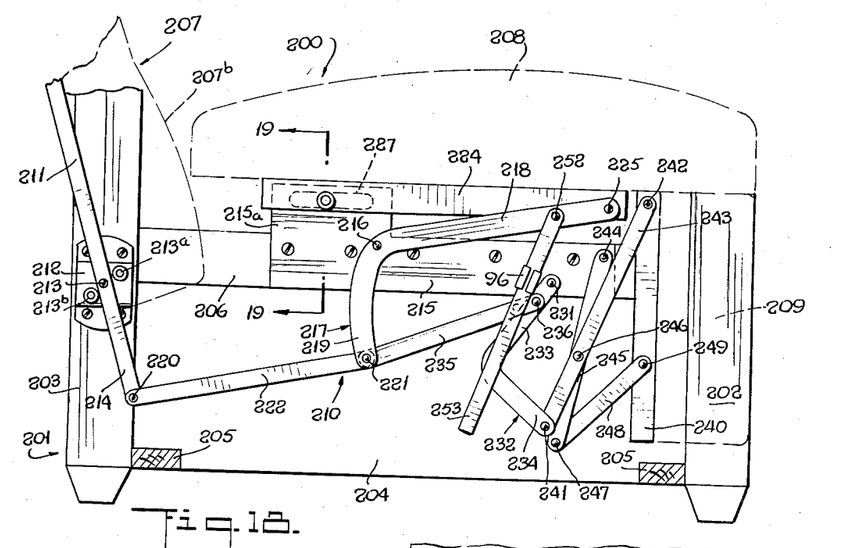
Fig. 18 is a side elevational cross sectional view illustrating yet another modification.
Figures 19, 20:
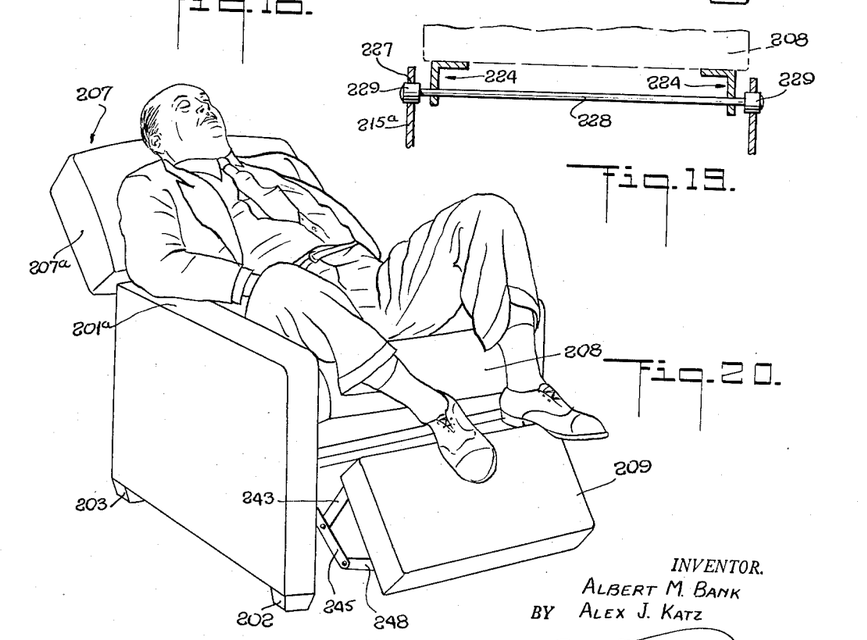
Fig. 19 is a cross sectional view taken on the line 19—19 of Fig. 18.
Fig. 20 is a perspective view illustrating how a person reclining on the chair may rest his feet on the rear edge of the legrest.

In Figs. 18, 19 and 20 there is shown another modification of the invention. In said figures there is shown a chair 200 comprising a supporting frame 201 having front legs 202 and rear legs 203. The front legs are connected to the rear legs by side frame members 204. The said frame members 204 are interconnected by transverse supporting members 205. The supporting frame comprises upper parallel side portions 206. Said supporting frame may have arms 201a as shown in Fig. 20. Said chair comprises a backrest 207, a seat 208, and a footrest 209. The seat 208 and the legrest 209 are interconnected to the supporting frame 201 and to the backrest 207 by mechanism 210 embodying the invention. Only the mechanism on one side of the chair is shown in Fig. 18. It will be understood that similar mechanism is located at the opposite side of the chair but only the mechanism on one side will be described as the mechanism on both sides are the same.

The backrest may have wings 207a overlying the arms 201a as shown in Fig. 20. Attached to the backrest 207 is a bar 211. Fixed to the rear legs 203 at opposite sides are brackets 212 each supporting a horizontal pivot pin 213. Bar 211 is pivoted to bracket 212 by means of said pivot pin 213. Stop pins 213a, 213b on bracket 212 limit angular movement of the backrest upwardly and rearwardly, respectively.

It will be noted that pivot pin 213 is located well below the back 208. It will also be noted that the upholstered portion 207b of the back 207 extends below the pivot pin 213. Each bar 211 has a downwardly extension 214 which extends below the pivot pin 213 and below the lower end of the upholstered portion 207b. Fixed to each of the supporting members 206 is a plate 215. Pivoted to plate 215 as by pivot pin 216 is a bell crank lever 217. Each bell crank lever 217 has forwardly and upwardly inclined arm 218 and a downwardly extending arm 219. At the lower end of the extension 214 is a pivot pin 220. At the lower end of arm 219 is a pivot pin 221. The pivot pins 221 are interconnected by link 222.

It will now be noted that when the backrest 207 is swung back in a counterclockwise direction, link 222 is moved forwardly to rotate the bell crank 217 in a counterclockwise direction.

Attached to the underside of the seat 208 are a pair of similar angle bars 224. The forward end of arm 218 of bell crank 217 is pivoted as by pivot pin 225 to the forward end of the seat supporting bar 224. The plate 215 has at its rear end an upward extension 215a formed with a horizontal slot 227. Fixed to the supporting bars 224 is a transverse shaft 228. Rotatably mounted on the outer ends of the shaft 228 are rollers 229 received within the slots 227. It will now be understood that as the bell cranks 217 rotate in a counterclockwise direction, the seat 208 as a whole is moved rearwardly as it is tilted upwardly. During such action the rollers 229 will roll back in the slots 227 so that as the front end of the seat tilts upwardly, the rear end is guided rearwardly so that the seat moves closer to the backrest to close the gap which would otherwise be formed by reason of the backrest being swung downwardly and rearwardly. Shaft 228 serves as an axis of pivotal movement for the seat.

Pivoted to the side plates 215 as on pivot pins 231, are elbow shaped links or levers 232. Each link 232 has an arm 233 which is inclined downwardly and rearwardly, and extending from the lower end thereof is a forwardly and downwardly inclined arm 234. Pivot pin 221 is connected by link 235 to an intermediate portion of arm 233 by means of a pin 236. Thus when the backrest is swung downwardly and rearwardly the link 235 will cause the elbow shaped levers 232 to swing about pivot pin 231 in a counterclockwise direction looking at Fig. 18.

The legrest 209 normally extends downwardly in a vertical direction from the underside of the forward end of the seat 208. Attached to its undersides are bars 240. Interconnecting the lower end of arm 234 with the upper end of bar 240 by means of pivot pins 241 and 242, respectively, is a lazy tong lever 243. Pivoted to the forward end of each plate 215 as on pivot pin 244 is a second lazy tong lever 245. Lever 245 crosses lever 243 and is interpivoted thereto by means of pivot pins 246. Pivoted to the lower end of lever 245 as on pivot 247 is a link 248. The forward end of link 248 is connected by means of pivot 249 to a lower end of bar 240. Thus, the legrest is connected to the frame by a lazy tong mechanism comprising the crossing levers 243, 245 and the links 232, 248.

It will now be understood that as the backrest is swung downwardly and rearwardly, the legrest is projected forwardly and is at the same time swung upwardly toward horizontal position.

Pivoted to each arm 218 as on pivot pin 252 is a bar 253 slidably received in a brake member 96 similar to the one described in Figs. 1 to 12.

It will now also be understood that as the chair is moved to reclining position, the legrest 209 moves away from the front end of seat 208. A person sitting in the chair can rest his feet on the rear or upper end of the legrest as shown in Fig. 20, particularly in intermediate positions. Of course, the person sitting in the chair can rest his legs on the legrest in fully reclining position.

It will also be understood that in each of the modifications disclosed herein, there is a backrest member and a seat member, one of which is pivoted to the frame. In all the modifications, as the backrest member is tilted back to reclining position, the front end of the seat member is tilted upwardly. In each of the mechanisms furthermore there is provided a legrest which extends downwardly from the front end of the seat member, such legrest being connected to the frame by a lazy tong mechanism actuated by and connected to one of said members, the arrangement being such that as the backrest member is tilted back to reclining position, the legrest is swung forwardly and upwardly away from the front end of the seat member thereby increasing the length of the reclining chair and providing a space between the front end of the seat member and the legrest. In the upright position of the chair, the legrest is close to the front of the frame, extending downwardly beneath the front end of the seat.

The lazy tong mechanism is wholly housed within the frame and below the seat when the chair is in upright position. In such position, the lazy tong mechanism is not exposed. With such construction, a person sitting in the chair may readily push his feet down on the floor in front of the chair to help start the reclining movement of the chair. The backrest member is pivoted to the frame rearwardly of the connection of the lazy tong mechanism to the frame. The lazy tong mechanism is connected to the frame at two spaced points. The separate pivotal connection of the backrest member to the frame permits movement of the backrest relative to all parts of the lazy tong mechanism, and also permits the legrest to be swung upwardly to a greater angle than the backrest.

Thus it is seen that a reclining article of furniture is provided which will provide the maximum area of support for the person of a user, and which is well adapted to meet the conditions of practical use.

As various possible embodiments might be made in the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In combination, a frame, a backrest pivoted thereto, a seat, means connecting said seat to said backrest and frame to tilt the front end of said seat upwardly and move the seat as a whole rearwardly relative to the frame as a whole and relative to the backrest as a whole, upon swinging said backrest backwardly about its pivot to reclining position, said means comprising a lever pivoted to said frame and having one arm pivotally connected to said seat and another arm connected by a link to said backrest.

2. An article of furniture comprising a supporting frame, a backrest pivoted to the frame, said backrest having an extension extending below its pivotal axis, a seat disposed above the pivotal connection of the backrest to the frame, a lever pivoted to the frame and having one arm extending forwardly and pivotally connected to the seat forwardly of the rear end thereof, said lever having a downwardly extending arm, link means connecting the extension on the backrest with said downwardly extending arm of the lever, whereby backward swinging movement of the backrest will tilt the front of the seat upwardly, and means to movably support the rear end of said seat for movement of the seat in a rearward direction as a whole relative to the frame and backrest as a whole, as the backrest is swung back towards reclining position.

3. The combination of claim 2, in combination with a legrest, and lazy tongs including a pair of interpivoted crossing levers, means to interconnect one of said crossing levers to the frame and to the legrest, and means to interconnect the other crossing lever to the legrest and to the first link means.

4. The combination of claim 3, in combination with friction brake means comprising a first brake member, pivotally connected at its upper end to the first arm of the lever, adjacent the forward end of the seat, a second brake member, means to pivotally connect said second brake member to the frame, and means interconnecting said brake members and frictionally and slidably engaging one of said brake members.

5. An article of furniture comprising a supporting frame, a backrest pivoted to the frame, said backrest having an extension extending below its pivotal axis, a seat, a lever pivoted to the frame and having one arm pivoted to the front end of the seat, link means connecting the extension on the backrest with another arm of the lever, link means connecting said first link means with the rear end of the seat, and resilient means interposed in the second mentioned link means to provide for resilient support for the rear end of the seat.

6. A chair comprising a fixed frame provided with supporting legs, a backrest pivoted to the frame, an extension on the backrest extending below the pivotal axis of the backrest, a lever pivoted to the frame, a seat spaced above the pivotal connection of the backrest to the frame, said lever having a forwardly extending arm pivoted to the seat, said lever having a downwardly extending second arm, a first link means interconnecting the extension on the backrest with the second arm of the lever, and means to support the seat rearwardly of the connection of the first arm of the lever to the seat for movement of the seat as a whole rearwardly and forwardly relative to the whole of the frame and backrest.

7. The combination of claim 6, in combination with a legrest, a lazy tongs comprising a pair of interpivoted levers, one of said pair of levers being pivoted at one end to the frame, a second link means connecting its other end to the footrest, the other of said pair of levers being pivoted at one end to the legrest, a third link means interconnecting the frame with the other end of said other of said pair of levers, and a fourth link means interconnecting the downwardly extending arm of the lever with the third link means.

8. The combination of claim 7, the pivotal connection of said backrest to said frame being located substantially below the underside of said seat.

9. The combination of claim 7, in combination with means to limit the angular movement of the backrest.

10. An article of furniture comprising a supporting frame, a backrest pivoted to the frame, an extension on the backrest extending below its pivotal axis, a seat spaced above the pivotal connection of the backrest to the frame, a lever pivoted to the frame and having one arm pivoted to the seat, link means connecting the extension on the backrest with the other arm of said lever, movable pivot means spaced from the backrest and movable with respect thereto and with respect to the frame to support the seat rearwardly of the connection between the first arm of the lever and said seat whereby to permit movement of the seat as a whole relative to all of the frame and backrest, a legrest, lazy tongs including a pair of interpivoted crossing levers, means to connect one of said pair of levers to the frame and to the legrest, and means to connect the other crossing lever to the legrest and to the first link means.

11. In combination, a supporting frame, a backrest pivoted thereto, a seat, a lever pivoted to the frame, said lever having one arm pivoted to the seat, said lever having a second arm, link means interconnecting the second arm of the lever with said backrest, pivot means movable relative to said frame and backrest to support the seat, rearwardly of the connection of the seat with the first arm of said lever, a legrest, lazy tongs comprising a pair of interpivoted arms, means to connect one of the interpivoted arms to the footrest and to the frame, and means to connect the other interpivoted arm to the legrest and to the first link means.

12. The combination of claim 11, in combination with friction means to retard movement of the backrest, seat and legrest.

13. The combination of claim 11, in combination with means to limit angular movement of the backrest.

14. The combination of claim 11, said seat being disposed wholly above the pivotal axis for said backrest.

15. The combination of claim 11, in combination with friction means to retard movement of said backrest, seat and legrest.

16. A chair comprising a supporting frame provided with legs, and having arms, a backrest pivoted to the frame and provided with wings overlying the arms when the backrest is in upright position, a seat disposed above the pivotal axis for the backrest, a lever pivoted to the frame and having one arm extending forwardly and pivotally connected to the front end of the seat, said backrest having an extension extending below its pivotal axis, said lever having a downwardly extending arm, link means connecting the extension on the backrest with said downwardly extending arm of said lever, and means to pivotally and movably support the rear end of said seat for movement of the seat as a whole relative to the whole of the backrest and frame.

17. An article of furniture comprising a supporting frame, a backrest pivoted to the frame, said backrest having an extension extending below its pivotal axis, a seat, a lever pivoted to the frame and having one arm extending forwardly and pivotally connected to the seat, said lever having a downwardly extending arm, link means connecting the extension on the backrest with said downwardly extending arm of said lever, and link means connecting said first link means with the seat rearwardly of the connection of the first arm of the lever with said seat.

18. The combination of claim 17, said second link means comprising a link pivoted mediately the ends thereof to said frame.

19. The combination of claim 17, in combination with a legrest, lazy tongs comprising a pair of interpivoted levers, one of said pair of levers being pivoted at one end to the frame, said lazy tongs including a third link means connecting the other end of said one of said interpivoted levers to said legrest, the other of said pair of levers being pivoted at one end of the legrest, said lazy tongs including a fourth link means connecting the frame with the other end of said other of said pair of levers, and a fifth link means interconnecting the downwardly extending arm with an intermediate portion of the fourth link means.

20. An article of furniture comprising a supporting frame, a backrest pivoted to the frame, said backrest having an extension extending below its pivotal axis, a seat, a lever pivoted to the frame and having one arm extending forwardly and pivotally connected to the front end of the seat, said lever having a downwardly extending arm, link means connecting the extension on the backrest with said downwardly extending arm of the lever, whereby backward swinging movement of the backrest will tilt the front of the seat upwardly, and means to movably support the rear end of said seat for movement in a rearward direction as the backrest is swung back toward reclining position, in combination with friction brake means comprising a first brake member pivoted to the first arm of said lever adjacent said seat, a second brake member, means to pivotally connect the second brake member to the supporting frame, and means interconnecting said brake members and frictionally and slidably engaging one of said brake members.

21. A chair comprising a fixed frame provided with supporting legs, a backrest pivoted to the frame, an extension on the backrest extending below the pivotal axis of the backrest, a lever pivoted to the frame, a seat, said lever having a forwardly extending arm pivoted to the seat, said lever having a downwardly extending second arm, a first link means interconnecting the extension on the backrest with the second arm of the lever, pivot means movable forwardly annd rearwardly of the whole of the backrest and frame to support the seat rearwardly of the connection of the first arm of the lever to the seat, a legrest, lazy tongs, means to connect one end of the lazy tongs to the frame, means to connect said lazy tongs to the second arm of the lever, and means to connect the other end of the lazy tongs to the legrest for moving the legrest upon moving the backrest.

22. An article of furniture comprising a supporting frame, a backrest pivoted to the frame, said backrest having an extension extending below its pivotal axis, a seat, a lever pivoted to the frame and having one arm extending forwardly and pivotally connected to the seat, said lever having a downwardly extending arm, link means connecting the extension on the backrest with said downwardly extending arm of said lever, link means connecting said first link means with the seat rearwardly of the connection of the first arm of the lever with said seat, a legrest, lazy tongs pivotally connected at one end to said frame and at the other end directly to said legrest, and link means to connect said lazy tongs to said downwardly extending arm of said lever.

23. In a reclining chair, a supporting frame, a backrest member, a seat member, means to pivot one of said members to said frame, means to tilt the front of the seat member upwardly upon reclining the backrest member from upright position, a legrest located at the front of the seat member and underlying the front end thereof disposed at the front end of the frame when the backrest member is in upright position, said legrest being movable as a whole away from said seat, lazy tong mechanism interconnecting the legrest with the frame, said lazy tong mechanism being located between the spaced sides of the frame and beneath the seat member when the backrest member is in upright position, and comprising a pair of interpivoted crossing levers, means to pivotally connect the front ends of both levers to said legrest at spaced points, and means to pivotally connect the rear ends of both levers to the frame at spaced points forwardly of the pivotal connection of said one of said members to said frame, and means connecting said lazy tong mechanism to one of said members to extend the lazy tong mechanism and cause the legrest to swing forwardly and upwardly and as a whole away from the front end of the seat member as the backrest member is reclined and the front of the seat member is tilted upwardly, and to retract the lazy tong mechanism to swing the legrest downwardly and rearwardly back to a position at the front of the frame to conceal the lazy tong mechanism when the backrest member is swung up from reclining to upright position.

24. In a reclining chair, a supporting frame, a backrest member, a seat member, means to pivot one of said members to said frame, means to tilt the front of the seat member upwardly upon reclining the backrest member from upright position, a legrest located at the front of the seat member and underlying the front end thereof and disposed at the front end of the frame when the backrest member is in upright position, said legrest being movable as a whole away from said seat, lazy tong mechanism interconnecting the footrest with the frame, said lazy tong mechanism being located between the spaced sides of the frame and beneath the seat member when the backrest member is in upright position and comprising a pair of interpivoted crossing levers, one lever being pivoted at one end to the frame forwardly of the pivotal connection of said one of said members to the frame, a link connecting the other end of said interpivoted lever with the legrest, the other interpivoted lever being pivoted at one end to the legrest, a link connecting the other end of said other interpivoted lever to the frame at a point spaced from the point of pivotal connection of the first lever to the frame and forwardly of the pivotal connection of said one of said members to the frame, and means connecting said lazy tong mechanism to one of said members to extend the lazy tong mechanism and cause the legrest to swing forwardly and upwardly and as a whole away from the front end of the seat member as the backrest member is reclined and the front of the seat member is tilted upwardly, and to retract the lazy tong mechanism to swing the legrest downwardly and rearwardly back to a position at the front of the frame to conceal the lazy tong mechanism, when the backrest member is swung up from reclining to upright position.

References Cited in the file of this patent

UNITED STATES PATENTS

| | | |
|---|---|---|
| 195,395 | Pope | Sept. 18, 1877 |
| 607,293 | Streit | July 12, 1898 |
| 967,665 | Piche | Aug. 16, 1910 |
| 2,276,053 | Luckhardt et al. | Mar. 10, 1942 |
| 2,535,687 | Lorenz | Dec. 26, 1950 |
| 2,604,141 | Maurer | July 22, 1952 |
| 2,615,496 | Lorenz et al. | Oct. 28, 1952 |
| 2,672,919 | Luckhardt | Mar. 23, 1954 |

FOREIGN PATENTS

| | | |
|---|---|---|
| 42,408 | France | July 19, 1933 |

(First addition to No. 714,601)